(12) United States Patent
Egli et al.

(10) Patent No.: US 7,718,581 B2
(45) Date of Patent: May 18, 2010

(54) METHOD USING COMPOSITION TO REDUCE CUTTING HEAD WEAR

(75) Inventors: Herbert Egli, Zwillikon (CH); Peter Ellenberger, Feldmeilen (CH)

(73) Assignee: Construction Research & Technology GmbH, Trostberg (DE)

( * ) Notice: Subject to any disclaimer, the term of this patent is extended or adjusted under 35 U.S.C. 154(b) by 884 days.

(21) Appl. No.: 10/526,953

(22) PCT Filed: Sep. 2, 2003

(86) PCT No.: PCT/EP03/09718

§ 371 (c)(1),
(2), (4) Date: Nov. 30, 2005

(87) PCT Pub. No.: WO2004/025080

PCT Pub. Date: Mar. 25, 2004

(65) Prior Publication Data

US 2006/0122074 A1  Jun. 8, 2006

(30) Foreign Application Priority Data

Sep. 13, 2002  (GB)  ................. 0221171.2

(51) Int. Cl.
  *C09K 8/06*  (2006.01)
  *C09K 8/32*  (2006.01)
  *C09K 8/38*  (2006.01)
  *E21B 21/00*  (2006.01)

(52) U.S. Cl. .................. 507/136; 507/102; 507/132; 507/133; 175/65; 175/69; 508/579; 516/10; 516/18

(58) Field of Classification Search ................ 508/136; 175/90, 327, 65, 69; 405/132, 138, 141; 507/103, 117, 136, 102, 132, 133, 118; 516/10, 516/18

See application file for complete search history.

(56) References Cited

U.S. PATENT DOCUMENTS

| 3,600,899 | A | * | 8/1971 | Watson et al. ............... 405/140 |
| 4,796,702 | A | * | 1/1989 | Scherubel ................ 166/308.6 |
| 5,443,305 | A | | 8/1995 | Heierli et al. |
| 6,194,354 | B1 | * | 2/2001 | Hatchman ................... 507/134 |
| 6,287,052 | B1 | * | 9/2001 | Basset et al. ............... 405/138 |
| 6,831,042 | B2 | * | 12/2004 | Ristol et al. ................ 507/120 |

FOREIGN PATENT DOCUMENTS

| WO | WO 99 18330 A | | 4/1999 |
| WO | WO 9918330 A1 | * | 4/1999 |
| WO | WO 01 12952 A | | 2/2001 |

\* cited by examiner

*Primary Examiner*—Ellen M McAvoy
*Assistant Examiner*—Pamela Weiss
(74) *Attorney, Agent, or Firm*—Curatolo Sidoti Co., LPA; Joseph G. Curatolo; Vincent A. Cortese

(57) ABSTRACT

A method of reducing wear in a cutting head of a tunnel boring machine, by means of the addition at the cutting head of a foamed aqueous liquid composition, which comprises a foaming agent and a lubricant, the lubricant being selected from the group consisting of high molecular weight polyethylene oxides and bentonite. Preferred foaming agents are anionic and nonionic surfactants. Wear rates of cutting elements of TBMs boring in hard rock are considerably reduced. A wear-reducing foamable concentrate is also described.

11 Claims, No Drawings

METHOD USING COMPOSITION TO REDUCE CUTTING HEAD WEAR

CROSS REFERENCE TO RELATED APPLICATIONS

This application is a national stage application of International Application No. PCT/EP2003/009718, filed Sep. 2, 2003, which claims the benefit of Application No. GB 0221171.2, filed Sep. 13, 2002, from which application priority is claimed.

This invention relates to a method of boring a tunnel in hard rock and to compositions for assisting such boring.

The boring of tunnels in hard rock, such as limestone and metamorphic or igneous rocks, has always presented more problems than has boring in softer rock. The most commonly used method of tunnel boring in such rock has been the drilling of blast holes, followed by blasting with explosives. It has been desired to use tunnel boring machines (TBMs), machines with large diameter cutting heads (sometimes in excess of 10 m), for tunneling in hard rock. The major problem of TBM use in such rock is the rapid wear of the cutting elements (hardened steel discs which protrude from the cutting head) and the necessity for frequent replacement, a disadvantage from both operational and economic points of view.

It has now been discovered that the use of a particular composition can reduce this wear considerably, permitting more efficient and economic boring in hard rock with a TBM. This invention therefore provides a method of reducing wear in a cutting head of a tunnel boring machine, by means of the addition at the cutting head of a foamed aqueous liquid composition, which comprises a foaming agent and a lubricant, the lubricant being selected from the group consisting of high molecular weight polyethylene oxides and bentonite.

The foaming agent may be any foaming agent, that is, any material that, when agitated in water, will cause stable foam to form. It is possible to use more than one such foaming agent in a composition for use in this invention. A wide variety of such materials is known to the art. The preferred materials for use as foaming agents in this invention are surfactants, that is, materials that have both hydrophilic components and hydrophobic components. Although any suitable surfactant can be used, it has been found that, for the purposes of this invention, the surfactants that work best are anionic or nonionic types, and these are the preferred surfactants.

If the surfactant is an anionic type, it is preferably a sulphate-containing surfactant, more preferably an alcohol sulphate, and most preferably a lauryl sulphate. Many suitable materials are known to the art, an example of a particularly preferred material being monoisopropanolamine lauryl sulphate (available commercially, for example, under the trade name "Sulfetal" Cjot 60).

While the performance of anionic surfactants is excellent, their use is sometimes undesirable if environmental considerations are important. For environmental reasons, it is preferred that the foam be short-lived, that is, that it remain a foam only for the time between its generation and the removal of the foamed liquid from the cutting face. The foam from anionic surfactants can be so stable and durable that it can be sometimes found in rivers remote from the job site. In such cases, nonionics are preferred; their performance on the job site is no less excellent, but they biodegrade more quickly and any foam generated lasts for a relatively short time. In addition, the breakdown components of the nonionic surfactants are considerably less harmful than those of the anionics, and they therefore represent less of a toxicological hazard to plant and animal life.

Examples of effective nonionic surfactants suitable for use in this invention include alkanolamides, aminoxides, ethoxylated alcohols, ethoxylated alkylphenols, ethoxylated esters, glucose and sucrose esters and derivatives thereof. Especially effective are the glucose and sucrose esters and their derivatives, particularly alkyl polyglucosides. Typical commercial examples of these include "Lutensol" (trade mark) GD 70 (ex BASF) and "Glucopon" (trade mark) (ex Cognis).

The lubricant may be chosen from one of two different materials, both of which are readily available commercially. By "high molecular weight" polyethylene oxide (PEO) is meant a PEO with a weight-average molecular weight of at least 1,000,000. Preferably the molecular weight is from 2,000,000-8,000,000. Such materials have previously been used in the boring of tunnels with TBMs, but never in connection with hard rock boring. Typical commercial materials include POLYOX (registered trade mark) WSR-301. A blend of different PEOs may be use, although, being a polymer, a PEO has a molecular weight distribution, and it is therefore already inherently a blend of different materials.

The alternative lubricant is bentonite. This clay material is already well known as a constituent of drilling muds, and it has also been used in some TBM applications. However, its use in conjunction with the foaming agents hereinabove described to achieve this particular end is new. Any commercially-available bentonite is suitable for the purposes of the invention, a typical example being "Tixoton" (trade mark).

The compositions are prepared for use by the addition of a suitable amount of water. Although the supply of dry compositions is theoretically possible and is not excluded from this invention, it is impracticable. One reason for this is that it introduces the task of producing the liquid composition on the job site—this can be difficult, especially with PEOs of high MW, which, although water-soluble, can be difficult to dissolve. In addition, other commercially-available additives (further described hereinunder) are often supplied only in solution or suspension form.

There are two methods of overcoming these difficulties. The first is to supply the compositions as a series of individual aqueous ingredients that can be metered in the correct individual proportions to a relatively large quantity of water for foaming. Thus, the PEO and/or the bentonite, the foaming agent and any optional ingredients (further described hereinunder) are provided individually in aqueous form. The required containment and metering equipment is well known to the art and does not therefore need to be further described here. This method has the advantage of versatility—the quantities of ingredients can be varied to suit local conditions as they arise and any optional components can be included or not included, as the case may be. It is even possible to include both types of lubricant (PEO and bentonite), and to change from one to the other. The disadvantage is, of course, that a further piece of equipment, with its associated cost and maintenance problems, is introduced.

A more desirable method for most applications is to provide a concentrate, an aqueous solution or suspension with a suitable proportion of the necessary ingredients, which is capable of being used quickly and easily. It is no problem to dilute such a concentrate and foam the diluted concentrate at a job site. Where the versatility of the metering approach previously outlined is not needed, this is much preferred, because of its simplicity of use and relative cheapness.

The quantities of ingredients referred to in the following paragraphs relate to an aqueous composition which comprises the dry ingredients plus sufficient water, either to render the individual ingredients in aqueous form for individual metering as hereinabove described, or for the preparation of an aqueous concentrate, as hereinabove described. The compositions are made up to 100% with water. This does not include the final dilution and foaming water (for which quantities see p. 5).

In the case where PEO is used as lubricant, the quantities of PEO used are from 0.1-3.0%, preferably from 0.4-2.0%, and more preferably from 0.5-1.0% by weight of the concentrate. The equivalent quantities of foaming agent are from 2-40%, preferably from 5-30%, and more preferably from 5-20%.

If bentonite is used as lubricant, the quantities are from 2-30%, preferably from 2-25%, and more preferably from 2-20%, and the equivalent quantities of foaming agent are from 2-40%, preferably from 4-20%, and more preferably from 5-15%.

It is possible to add other ingredients to the compositions for use in this invention. Two particularly useful ones are sequestering agents and foam boosters. These are generally more effective in compositions where PEO is the lubricant, but they can be used also with bentonite. In addition, in the preferred cases, they are more often useful with anionic surfactants; they have little effect with nonionics. This is especially true of the sequestering agent.

The sequestering agent is present to counter any problems brought about by the use of hard water in the preparation of the final foamed solution—hard water can cause the precipitation of the foaming agent and render the composition useless. If there is no hard water present, a sequestering agent is naturally not needed, but the addition of such an agent provides a composition which may be used in any water conditions, and which is therefore always ready for use in any circumstances. Any suitable sequestering agent may be used, the quantities used being in the range of up to 5%, preferably from 0.1-5%, more preferably from 0.5-2%, and most preferably from 1-1.5%. An example of a sequestering agent which is suitable for use in this invention is "Cublen" (trade mark) K2523.

The foam booster may likewise be any suitable material. The quantities used are up to 10%, preferably from 0.1-10%, and more preferably from 0.1-1%. An example of a foam booster which is suitable for use in this invention is "Aromox" (trade mark) MCD-W.

The invention also provides a wear-reducing foamable liquid concentrate, consisting of at least one lubricant selected from high molecular weight polyethylene oxide and bentonite, and at least one foaming agent which gives rise to short-lived foams, optionally also containing at least one sequestering agent and at least one foam booster, the quantities present being respectively (a) in the case of polyethylene oxide as lubricant:
0.1-3% polyethylene oxide;
2-40% foaming agent;
up to 5% sequestering agent; and
up to 1% foam booster;

and (b) in the case of bentonite as the lubricant:
2-30% bentonite; and
2-40% foaming agent;

by weight of the concentrate, the remainder being water.

In use, in the case of a concentrate, the concentrate is added to a suitable quantity of water and foamed, before being pumped to the rotating cutting head and injected at the interface of cutting head and rock. In the case of an individual ingredient metering system, the required quantities of aqueous ingredients are metered to a suitable quantity of water and foamed. Typically, the concentrate/individual ingredients previously described is or are diluted with water to give an aqueous composition having from 1-20%, preferably 1-10%, more preferably from 1-8% and most preferably from 1-6% of concentrate/individual ingredients.

This diluted composition is foamed by any convenient means to give a volume expansion of from 5-40, preferably from 5-20, more preferably from 8-20 times the volume of the unfoamed material.

The actual dilution of the concentrate/individual ingredients and the amount to which it is foamed will vary considerably, depending on the particular circumstances. Such factors as diameter of cutting head, number and location of injection nozzles and nature of rock will have a major effect. The essential requirement is to maintain a layer of foam in contact with the rock face across the entire area of the cutting head. Achieving this requirement is a matter of routine experimentation and the skilled person will easily be able to do it. Typical figures for a concentrate of the type hereinabove described are from 0.5-10.0, preferably from 0.5-6.0, more preferably from 1-4 kg concentrate/$m^3$ rock removed. If individual aqueous ingredients are being added, equivalent quantities can easily be calculated. It is emphasized that these figures are given only as a general guideline, and that certain conditions may require lower or higher quantities of individual ingredients or concentrate.

It is a surprising feature of this invention that the use of an aqueous liquid composition as hereinabove described results in a considerable reduction in wear of cutting elements in hard rock, leading to longer cutting head life and less frequent replacement, and therefore better and more economical tunnel boring. It is believed, without restricting the scope of this invention in any way, that the fine material produced at the drilling face of the TBM is bound together by the aqueous liquid composition and acts as a lubricant.

The invention is now illustrated by the following non-limiting examples.

Composition A (Using Anionic Surfactant)
The following ingredients are used:

| | |
|---|---|
| "Polyox" WSR 301 polyethylene oxide, weight-average molecular weight 4,000,000 ("PEO") | 0.83% |
| "Sulfetal" Cjot 60 surfactant | 9.0% |
| "Cublen" K 2523 sequestering agent ("SA") | 0.3% |
| "Aromox MCD-W foam booster ("FB") | 0.15% |
| water | to 100% |

Compositions B and C (Using Nonionic Surfactant)
The compositions are as follows:

| | B | C |
|---|---|---|
| "Lutensol" GD 70 | 10.0% | 10.0% |
| "Polyox" WSR 301 | 0.9% | |
| bentonite | | 4.2% |
| sodium bicarbonate | | 0.4% |
| water | to 100% | to 100% |

Testing

A method of ascertaining the effectiveness of the compositions for use in this invention prior to use with a TBM, thereby saving time and money, requires the following apparatus:

PVC jar, 1 litre, wide mouth test specimen silicon carbide powder (0.841-1.19 mm)

The test specimen consists of three wheels of ST 50 steel of 50 mm diameter and 14 mm thickness with a 10 mm diameter axial hole, the three being secured to an M10 bolt by any suitable means (such as nuts and washers), such that there is about 14 mm space between adjacent wheels.

The procedure is as follows:

400 g. of the silicon carbide is mixed with quantities of water and composition and added to the jar. A test specimen, of which the weights of the three individual wheels are accurately known, (to 0.001 g.) is then added to the jar, and the jar is sealed, placed on a mill and rolled for 3 hours at 125 rpm. The wheels are then weighed and the loss of weight (wear) is found.

The compositions A, B and C are tested in this way. In each case, the compositions are diluted with water (5% composition in water) and 30 and 60 g samples are foamed to give a volume expansion of 10 times. As a control, 60 g water is added to a 400 g sample of the silicon carbide and tested. The wear rates of the test specimens are as follows:

|  |  |
|---|---|
| SiC + water | 204 mg |
| SiC + 30 g A | 190 mg |
| SiC + 60 g A | 157 mg |
| SiC + 30 g B | 129 mg |
| SiC + 60 g B | 115 mg |
| SiC + 30 g C | 123 mg |
| SiC + 60 g C | 90 mg |

As can be seen, the wear rates are reduced, in some cases very substantially.

The invention claimed is:

1. A method of boring hard rock by means of a tunnel boring machine comprising hardened steel discs which protrude from the cutting head, wherein wear in the cutting head is reduced, comprising tunnel boring in hard rock, and adding at the cutting head while boring a foamed aqueous liquid composition injected at the interface of the cutting head and the hard rock, which composition comprises a foaming agent and a lubricant, the lubricant being selected from high molecular weight polyethylene oxides.

2. The method of claim 1, in which the individual ingredients of the foaming composition are dispensed in individual aqueous form into water and are converted to foam.

3. The method of claim 1 wherein the foaming agent is at least one of anionic or nonionic surfactants.

4. The method of claim 1, in which the composition is supplied as a concentrate, which is diluted with water in situ, to provide the foaming composition.

5. The method of claim 3, wherein at least one surfactant is nonionic and comprises at least one of alkanolamines, aminoxides, ethoxylated alcohols, ethoxylated alkylphenols, ethoxylated esters, glucose esters, sucrose esters or derivatives thereof.

6. The method of claim 1, in which the polyethylene oxide has a weight average molecular weight of at least 1,000,000.

7. The method of claim 4, in which the concentrate is added in an amount of about 0.5 to about 10 kg/m$^3$ of rock removed.

8. The method of claim 4, in which the wear-reducing foamable liquid concentrate also contains at least one of a sequestering agent or foam booster, in which the components of the wear-reducing foamable liquid concentrate are present in the following amounts:

0.1% to 3% polyethylene oxide;

2% to 40% foaming agent;

from greater than 0% to 5% sequestering agent; and from greater than 0% to 10% foam booster;

by weight of liquid composition, the remainder being water.

9. The method of claim 8, in which the wear-reducing foamable liquid concentrate is diluted in about 1 to about 20 volumes of water and foamed to provide a volume expansion of from about 5 to about 40 times the volume of the unfoamed material.

10. The method of claim 1 wherein the foaming agent is at least one nonionic surfactant.

11. The method of claim 10, in which the nonionic surfactant comprises at least one of alkanolamines, aminoxides, ethoxylated alcohols, ethoxylated alkylphenols, ethoxylated esters, glucose esters, sucrose esters or derivatives thereof.

* * * * *